INVENTORS
CHARLES A. LONG
LYNN E. BYERS
BY
Dick & Zarley
ATTORNEYS

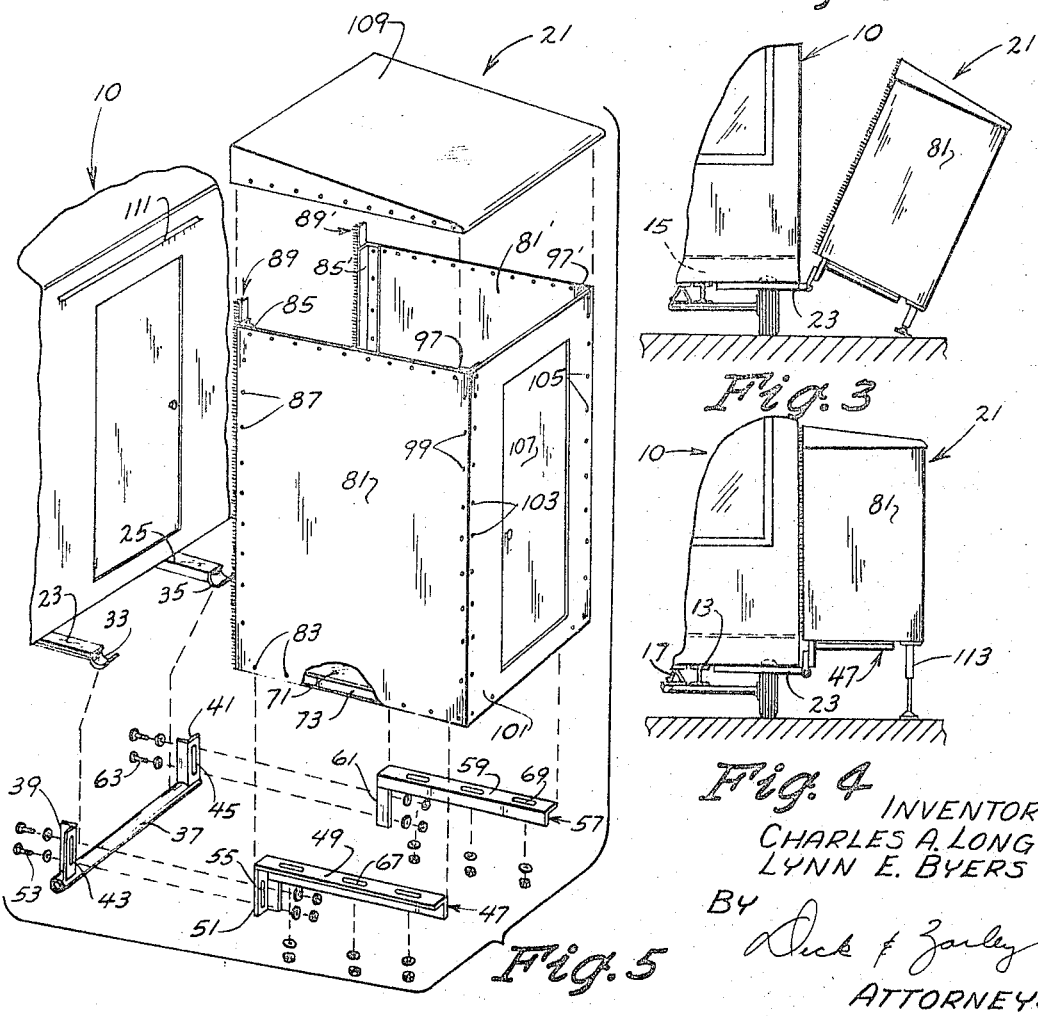

United States Patent Office 3,348,345
Patented Oct. 24, 1967

3,348,345
ROTATABLE PORCH FOR A MOBILE HOME
AND METHOD OF MOUNTING
Lynn E. Byers and Charles A. Long, both of
Slater, Iowa 50244
Filed Apr. 7, 1965, Ser. No. 446,187
13 Claims. (Cl. 52—79)

ABSTRACT OF THE DISCLOSURE

A porch for a mobile home including a pair of spaced apart arm members secured to the underside of the home and having channels at their free ends. A pipe is detachably rotatably received in the channels and the pipe is operatively connected to the floor of the porch.

This invention relates to a porch and more particularly to a porch for mobile homes.

For various reasons, owners of mobile homes usually find it necessary to attach a porch of some description to their mobile home. These porches are difficult to construct and are more difficult to conveniently secure them to the mobile home. Additionally, the various types of mobile homes have different floor heights, etc. so that a porch fabricated for one mobile home cannot be used on another mobile home without extensive alteration thereof.

Therefore, a principal object of this invention is to provide a porch for mobile homes which is conveniently attached to and detached from a mobile home.

A further object of this invention is to provide a porch for mobile homes which may be secured to mobile homes regardless of the size or shapes thereof.

A further object of this invention is to provide a porch for mobile homes which includes a supporting frame which is selectively horizontally and vertically adjustable.

A further object of this invention is to provide a porch for mobile homes which permits convenient leveling thereof.

A further object of this invention is to provide a porch for mobile homes which is light weight but yet strong.

A further object of this invention is to provide a porch for mobile homes which is of glass fiber construction.

A further object of this invention is to provide a porch for mobile homes which includes a novel weatherstripping means between it and the mobile home.

A further object of this invention is to provide a porch for mobile homes which is conveniently stored.

A still further object of this invention is to provide a porch for mobile homes which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a perspective view of the porch as it appears when it is secured to a mobile home;

FIG. 2 is a fragmentary end view of the supporting frame portion of the porch;

FIG. 3 is a fragmentary end view of the supporting frame and porch illustrating the relationship of the porch to the mobile home during the attachment operation;

FIG. 4 is a fragmentary end view of the porch secured to the mobile home;

FIG. 5 is an exploded perspective view of the porch;

Figure 6:
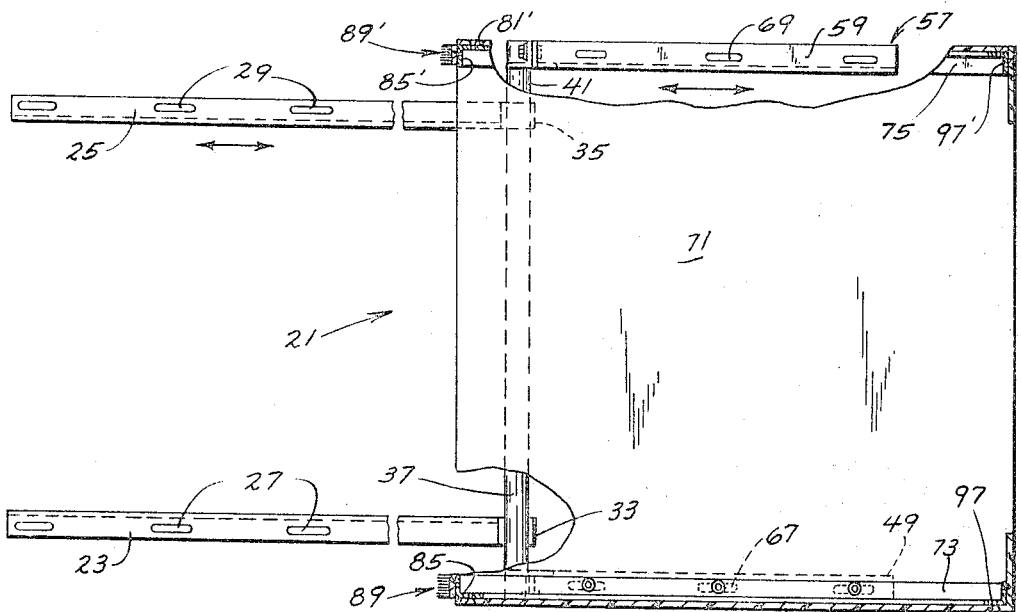
FIG. 6 is a sectional view of the porch as seen on line 6—6 of FIG. 1 at an enlarged scale and with portions thereof cutaway to more fully illustrate the invention.

The numeral 10 generally indicates a mobile home having at least two I-beams 11 (not shown) and 13 extending the length thereof upon which the mobile home floor assembly 15 is supported. A plurality of joists or braces 17 are secured to and extend between I-beams 11 and 13 along the length thereof. Floor joists 17 may be of any configuration but usually have a flat bottom flange 19.

Figure 7:
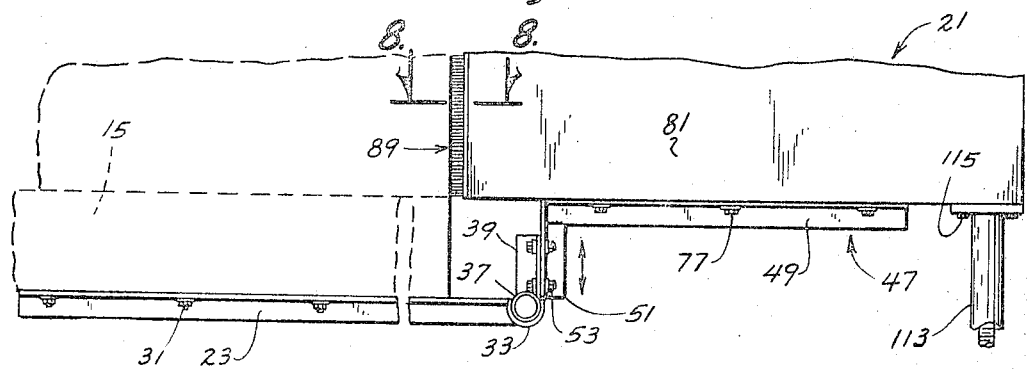
FIG. 7 is a fragmentary end view of the lower portion of the porch.

The numeral 21 generally indicates the porch as seen in the drawings. As best seen in FIGS. 6 and 7, elongated arm members 23 and 25, which are L-shaped in cross-section, having a plurality of slots 27 and 29 formed therein respectively are bolted to the underside of the mobile home by means of bolts 31. Arm members 23 and 25 have substantially U-shaped channels 33 and 35 secured to their outer ends respectively by welding or the like.

Channels 33 and 35 are adapted to rotatably receive a pipe 37 extending therebetween. Pipe 37 is provided with L-shaped arm members 39 and 41 extending upwardly from the opposite ends thereof. As best seen in FIG. 5, arm members 39 and 41 are provided with vertical slots 43 and 45 formed therein respectively. As best seen in FIG. 5, a supporting bracket 47 including a horizontal portion 49 and a vertical portion 51 extending downwardly from one end thereof is adapted to be vertically adjustably secured to arm member 39 by means of bolts 53 extending through slot 43 of arm member 39 and slot 55 in vertical portion 51 of bracket 47. A bracket 57 including a horizontal portion 59 and a vertical portion 61 extending downwardly from one end thereof is adapted to be vertically adjustably secured to arm member 41 by means of bolts 63 extending through slot 45 in arm member 41 and slot 65 (not shown) in vertical portion 61. Horizontal portions 49 and 51 of brackets 47 and 57 respectively are provided with elongated slots 67 and 69 formed therein respectively.

As best seen in FIG. 6, a floor 71 is placed on horizontal portions 49 and 59 of brackets 47 and 57 respectively. A pair of elongated braces 73 and 75 are positioned on the upper surface of floor 71 at opposite sides thereof as seen in FIG. 6. Floor 71 is secured to bracket 47 by means of bolts 77 extending downwardly through brace 73, through floor 71 and through slots 67 in horizontal portion 49 of bracket 47. Floor 71 is secured to bracket 57 by means of bolts 79 (not shown) extending downwardly through brace 75, through floor 71 and through slots 69 in horizontal portion 59 of bracket 57. Floor 71 is preferably constructed of three-eighths inch plywood having a coating of glass fiber on all sides thereof.

Figure 8:
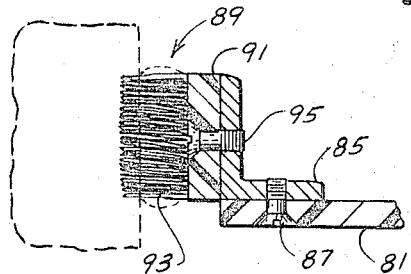
FIG. 8 is a sectional view of the porch as seen on line 8—8 of FIG. 7 which illustrates the weatherstripping means associated therewith, at an enlarged scale.

As best seen in FIG. 5, a vertical side wall 81 is secured at its lower end to brace 73 by means of bolts 83 extending therethrough. A L-shaped brace 85 is secured to the inner surface of sidewall 81 adjacent the inner vertical edge thereof by means of bolts 87 extending therethrough. An elongated plastic weatherstrip 89 including a base portion 91 having a plurality of elongated bristles 93 extending outwardly therefrom is secured to brace 85 by means of bolts 95 extending therethrough. It can be appreciated that the bristles 93 separate to permit the passage of bolt 95 therethrough so that bolt 95 will be contacting base portion 91 as best seen in FIG. 8.

An elongated L-shaped brace 97 is secured to the inner surface of side 81 adjacent the other vertical side edge by means of bolts 99 extending therethrough. As seen in FIG. 5, porch 21 includes an opposite side 81' which is identical to side 81. Side 81' is secured to floor 71 as was side 81. Inasmuch as side 81' and its associated structure is identical to side 81 and its associated structure, only one side will be described with " ' " indicating identical structure.

Porch 21 includes a front wall 101 which is secured at one of its vertical side edges to brace 97 by means of bolts 103 extending therethrough and is secured at its other vertical side edge to brace 97' by means of bolts 105 extending therethrough. Front wall 101 is provided with a conventional door 107. As seen in FIG. 5, a roof 109 is secured to the upper ends of side walls 81, 81' and front wall 101 by any convenient means such as bolts or the like. The upper inner end of roof 109 is adapted to be placed adjacent the mobile home at a point below the drip rail 111. Conventional screw type jacks 113 and 113' are positioned below the outer lower ends of floor 71 and may be secured thereto by bolts 115 if so desired.

The normal method of operation is as follows: Arm members 23 and 25 would be loosely bolted to any convenient means on the underside of the mobile home such as I-beams 11 and 13, a pair of joists 17, floor assembly 15 or brackets for the steps that are usually secured thereto, so that they may be moved horizontally if so desired. Brackets 47 and 57 would be secured to lower surface of floor 71 as previously described. Arm members 39 and 41 on pipe 37 would then be bolted to brackets 47 and 57 as previously described. Pipe 37 is then placed in channels 33 and 35 as seen in FIG. 2. The floor is then leveled by any convenient means such as by jacks 113 and 113' so that the porch floor 71 is aligned with the upper portion of the floor of the mobile home. Slots 27 and 29 in arm members 23 and 25 permit floor 71 to be moved towards or away from the mobile home so that the inner end of floor 71 is placed adjacent the exterior surface of the mobile home. Bolts 53 and 63 extending through slots 43, 55 and 45, 61 permit the floor to be raised or lowered. When floor 71 has been aligned with the floor of the mobile home, bolts 31 extending through arm members 23 and 25 are tightened to prevent further sliding movement thereof. Bolts 53 and 63 are also tightened to maintain floor 71 in its desired position.

When floor 71 has been leveled and aligned, the floor is tilted back down to the position seen in FIG. 2 and side wall 81, side wall 81', front wall 101 and roof 109 are assembled as previously described. The porch is then jacked up tight against the mobile home. As the porch is pressed adjacent the exterior surface of the mobile home, bristles 93 of weather strip 89 compress as seen in FIG. 8 to form a weatherproof seal therebetween.

It can be appreciated that the structure of the porch and its supporting frame permit the porch to be secured to any number of different sizes or makes of trailers. It can also be appreciated that a convenient means is provided for attaching and detaching a porch to and from a mobile home.

The porch is extremely lightweight but yet is very durable due to its glass fiber construction. Side walls 81, 81', front wall 101 and roof 109 are preferably constructed of one-quarter inch glass fiber. Braces 85, 85', 97, 97' and 73 are also constructed of glass fiber.

Thus it can be seen that the porch accomplishes at least all of its stated objectives.

Some changes may be made in the construction and arrangement of our porch for mobile homes without departing from the real spirit and purpose of our invention, and it is our intention to cover by our claims, any modified forms of structure or use of mechanical equivalents which may be reasonably included within their scope.

We claim:
1. In a porch for mobile homes,
first and second spaced apart arm members having open channels at one of their ends, said first and second arm members secured to the underside of a mobile home,
a pipe detachably rotatably mounted in and extending between said channels,
first and second brackets operatively secured to said pipe,
a floor member secured to said first and second brackets, and an enclosure means secured to said floor member.

2. The porch of claim 1 wherein said first and second arm members are selectively horizontally slidably secured to the underside of said mobile home.

3. The porch of claim 1 wherein said pipe has third and fourth arm members at its opposite ends and said first and second brackets have vertical portions which are selectively slidably secured to said third and fourth arm members.

4. The porch of claim 1 wherein said first and second brackets are selectively slidably secured to said floor member.

5. The porch of claim 1 wherein said enclosure means has a weatherstrip means secured thereto which is positioned between said mobile home and said enclosure means; said weatherstrip means comprised of a base portion having a plurality of flexible bristles extending outwardly therefrom.

6. In combination with a mobile home,
first and second arm members horizontally adjustably secured to the underside of said mobile home in a spaced relationship and having a portion of their lengths extending horizontally outwardly from one side of said mobile home,
substantially U-shaped channels secured to the outer ends of said first and second arm members,
a pipe rotatably mounted in said channels and extending therebetween,
said pipe having third and fourth arm members adjacent its opposite ends extending upwardly therefrom,
a first bracket including a horizontal portion and a fifth arm member extending vertically downwardly from one end thereof which is vertically adjustably secured to said third arm member,
a second bracket including a horizontal portion and a sixth arm member extending vertically downwardly from one end thereof which is vertically adjustably secured to said fourth arm member,
a floor member secured to said horizontal portions of said first and second brackets, and a plurality of wall members operatively secured at their lower ends to said floor member,
a roof means secured to the upper ends of said wall members, and a means for maintaining said floor member in a horizontal position.

7. The porch of claim 6 wherein at least some of said wall members are interchangeable.

8. In a porch for mobile homes,
first and second spaced apart arm members having open channels at one of their ends, said first and second arm members secured to the underside of a mobile home,
a pipe detachably rotatably mounted in and extending between said channels,
first and second brackets operatively secured to said pipe,
and a floor member secured to said first and second brackets.

9. The method of attaching a porch to a mobile home, comprising the following steps,
securing first and second arm members having channels on one of their ends to the underside of a mobile home,
securing first and second brackets to a floor member,
securing a pipe member to said first and second brackets,
placing said pipe in said channels,
and leveling and aligning said floor member with respect to said mobile home.

10. The method of attaching a porch to a mobile home, comprising the following steps,
securing first and second arm members having channels on one of their ends to the underside of a mobile home, securing first and second brackets to a floor member, securing a pipe member to said first and second brackets, placing said pipe in said channels, leveling and aligning said floor member with respect to the mobile home, securing an enclosure means to said floor member, said enclosure means having a compressible weather strip means secured thereto, and jacking said floor member adjacent its outer end until said floor member is level and until said weatherstrip means is compressed to form a weatherproof seal between said enclosure means and said mobile home.

11. The method of claim 10 wherein said first and second arm members are secured to the frame of said mobile home.

12. The method of claim 10 wherein said first and second arm members are secured to the floor assembly of said mobile home.

13. The method of claim 10 wherein said mobile home includes step brackets secured to the underside thereof and wherein said first and second arm members are secured to said step brackets.

References Cited

UNITED STATES PATENTS

| | | | |
|---|---|---|---|
| 2,860,384 | 11/1958 | Wait | 52—69 |
| 3,136,436 | 6/1964 | Erlinder | 214—302 |
| 3,300,915 | 1/1967 | Brasch | 52—73 |

FOREIGN PATENTS 1,134,409  12/1956  France.

JOHN E. MURTAGH, *Primary Examiner.*